(12) United States Patent
Mochizuki

(10) Patent No.: US 8,130,405 B2
(45) Date of Patent: Mar. 6, 2012

(54) PRINTING APPARATUS WITH UNITS FOR EMBEDDING INDENTIFICATION INFORMATION AND DETECTING WHEN PAGES TO BE PRINTED ARE OUT OF ORDER

(75) Inventor: Mamoru Mochizuki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1253 days.

(21) Appl. No.: 11/878,888

(22) Filed: Jul. 27, 2007

(65) Prior Publication Data
US 2008/0158604 A1    Jul. 3, 2008

(30) Foreign Application Priority Data

Dec. 28, 2006   (JP) .................. 2006-355535

(51) Int. Cl.
*G06K 15/00*    (2006.01)
(52) U.S. Cl. ............. 358/1.17; 358/1.15; 358/1.18; 382/100; 382/289; 382/296
(58) Field of Classification Search ........... 358/1.15, 358/1.17, 1.18; 382/100, 289, 296
See application file for complete search history.

(56) References Cited

U.S. PATENT DOCUMENTS

| 7,301,656 B1* | 11/2007 | Nakagiri et al. ............ 358/1.15 |
| 2006/0193522 A1* | 8/2006 | Sonoda et al. ............ 382/232 |

FOREIGN PATENT DOCUMENTS

| JP | 2005014364 A | * | 1/2005 |
| JP | A-2005-014364 | | 1/2005 |

* cited by examiner

*Primary Examiner* — King Poon
*Assistant Examiner* — Jacky X Zheng
(74) *Attorney, Agent, or Firm* — Oliff & Berridge, PLC

(57) ABSTRACT

A printing apparatus that can maintain consistency between image information and page numbers with respect to that image information. The printing apparatus includes: a data input unit that embeds identification information for identifying pages to be printed in image information; and a data converting unit, a layout determining unit, a rasterizing unit and a print engine control unit that determine whether or not the processing order is a predetermined page order on the basis of the identification information that has been embedded in each image information set and, when the processing order is the predetermined page order, perform processing in a state where the identification information remains embedded with respect to the image information serving as the determination target.

13 Claims, 10 Drawing Sheets

PRINTING APPARATUS WITH UNITS FOR EMBEDDING INDENTIFICATION INFORMATION AND DETECTING WHEN PAGES TO BE PRINTED ARE OUT OF ORDER

CROSS-REFERENCE TO RELATED APPLICATIONS

This application is based on and claims priority under 35 USC 119 from Japanese Patent Application No. 2006-355535 filed Dec. 28, 2006.

BACKGROUND

1. Technical Field

The present invention relates to a printing apparatus and particularly to a printing apparatus that includes the function of detecting when pages to be printed are out of order and when there is a missing page.

2. Related Art

Conventionally, as technology relating to printing apparatus that include a printing function, such as printers, facsimiles and multifunction machines, various types of technology that detect when pages to be printed are out of order and when there is a missing page have been proposed. For example, there is known technology where page numbers are added as footer information to image information per page to be printed, the page numbers are sent to a print engine section, the page numbers included in the footer information of the received image information are checked in the print engine section against the number of pages to be printed next and, as a result of the check, printing is stopped when the page numbers and the number of pages to be printed next are not consistent, and printing is performed on the basis of image information from which the footer information has been deleted when the page numbers and the number of pages to be printed are consistent.

Incidentally, in this type of printing apparatus, it is necessary to maintain the consistency between the image information and the page numbers assigned to that image information in order to detect when the pages are out of order and when there is a missing page.

However, there has been the problem that even when the aforementioned technology is applied, sometimes the consistency between the image information and the page numbers assigned to that image information cannot be maintained.

SUMMARY

The present invention has been made in order to address this problem and provides a printing apparatus that can maintain consistency between image information and page numbers with respect to that image information.

BRIEF DESCRIPTION OF THE DRAWINGS

An exemplary embodiment of the present invention will be described in detail based on the following figures, wherein.

DETAILED DESCRIPTION

Figure 1:
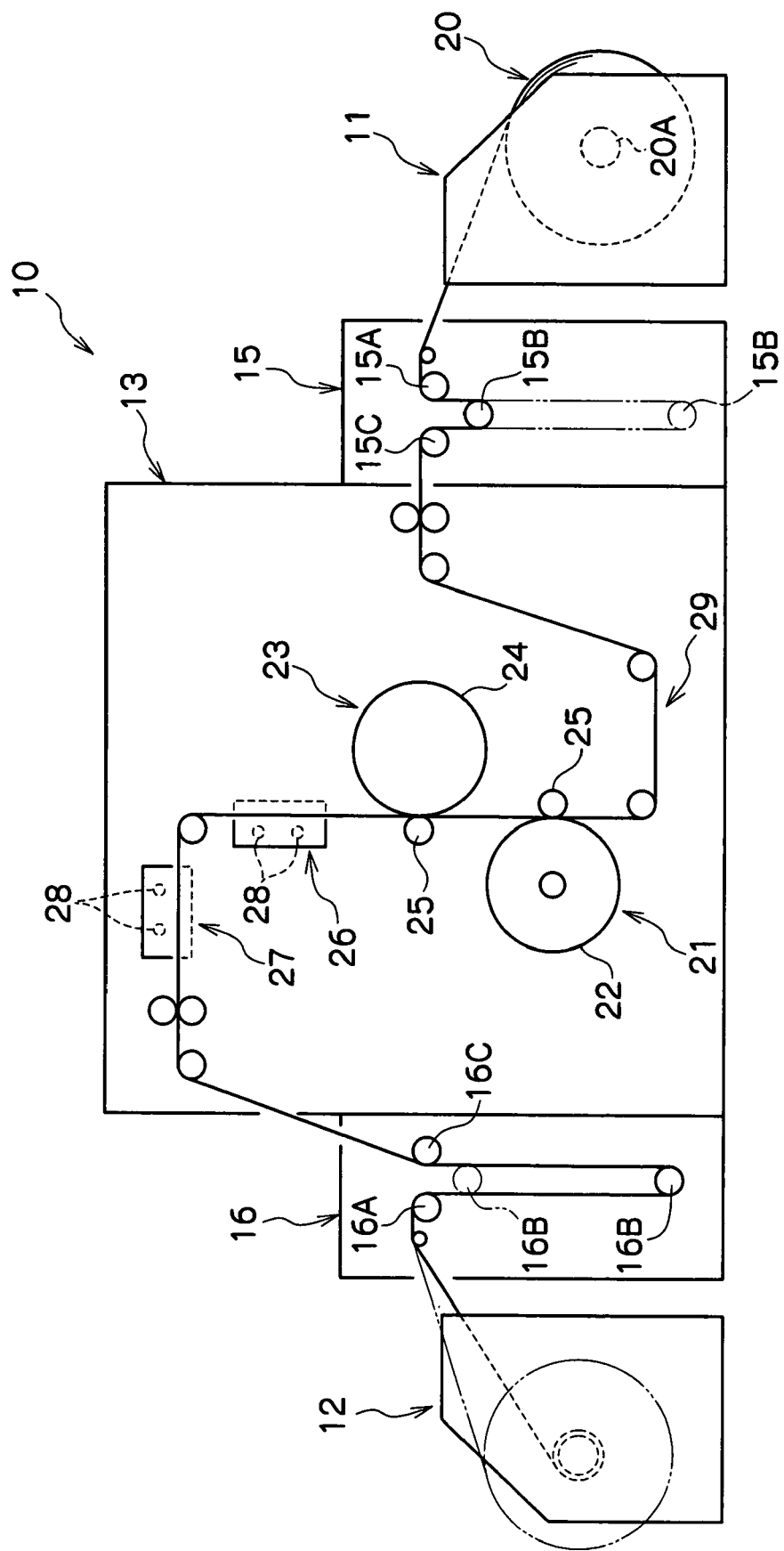
FIG. 1 is a configural diagram showing the configuration of a printing apparatus pertaining to the exemplary embodiment.

In FIG. 1, there is shown the general configuration of a printing apparatus 10 pertaining to an exemplary embodiment of the present invention.

The printing apparatus 10 is disposed with a preprocessing device 11, a buffer device 15, a print engine section 13, a buffer device 16, and a post-processing device 12.

Roll-like continuous paper 20 wrapped around a core 20A is housed in the preprocessing device 11. The preprocessing device 11 is configured to convey the continuous paper 20 in the longitudinal direction of the continuous paper and supply the continuous paper 20 to the buffer device 15.

Three wrap rollers 15A, 15B and 15C are disposed in the buffer device 15, and just the wrap roller 15B is configured to be movable up and down. The continuous paper 20 conveyed from the preprocessing device 11 is wrapped in order onto the wrap rollers 15A, 15B and 15C and supplied to the print engine section 13 via the wrap rollers 15A, 15B and 15C. The buffer device 15 absorbs differences in the conveyance speed by causing the wrap roller 15B to move up and down when the conveyance speed of the continuous paper 20 supplied from the preprocessing device 11 and the conveyance speed of the continuous paper 20 supplied to the print engine section 13 are different.

A first developing unit 21, a second developing unit 23, a first fixing unit 26 and a second fixing unit 27 are disposed in the print engine section 13. A conveyance path 29 along which the continuous paper 20 is conveyed in the order of the first developing unit 21, the second developing unit 23, the first fixing unit 26 and the second fixing unit 27 is also formed in the print engine section 13.

The first developing unit 21 and the first fixing unit 26 face one side of the continuous paper 20 conveyed along the conveyance path 29, and the second developing unit 23 and the second fixing unit 27 face the other side of the continuous paper 20.

A photoconductor drum 22 is disposed in the first developing unit 21, and a photoconductor drum 24 is disposed in the second developing unit 23. In the first developing unit 21 and the second developing unit 23, the electrophotographic process is applied to form images (toner images) corresponding to image information on the photoconductor drums 22 and 24. Further, in the first developing unit 21 and the second developing unit 23, transfer rolls 25 are disposed facing the photoconductor drums 22 and 24.

In the first developing unit 21, the continuous paper 20 is nipped by and held between the photoconductor drum 22 and the transfer roll 25, and the image formed on the photoconductor drum 22 is transferred to one side of the continuous paper 20. In the second developing unit 23, the continuous paper 20 is nipped by and held between the photoconductor drum 24 and the transfer roll 25, and the image formed on the photoconductor drum 24 is transferred to the other side of the continuous paper 20.

Heating means 28 such as halogen lamps are disposed facing the continuous paper 20 in the first fixing unit 26 and the second fixing unit 27. The heating means 28 heat the surface of the continuous paper 20 to cause the images (toners) that have been transferred to the continuous paper 20 to be fused and fixed to the continuous paper 20.

Thus, the print engine section 13 is configured to be capable of printing on both the front and back sides of the continuous paper 20. It will be noted that the first developing unit 21 and the second developing unit 23 may be configured to form a full-color image using toners of the respective colors of yellow (Y), magenta (M), cyan (C) and black (K) or be configured to form a monochromatic image using toner of a color such as black.

Further, one of either the first developing unit 21 and the first fixing unit 26 or the second developing unit 23 and the second fixing unit 27 may be omitted such that printing is performed just on one side of the continuous paper 20.

The continuous paper 20 on which the images have been formed by the print engine section 13 is conveyed to the buffer device 16.

Similar to the buffer device 15, three wrap rolls 16A, 16B and 16C are disposed in the buffer device 16, and just the wrap roll 16B is configured to be movable up and down. The continuous paper 20 conveyed from the print engine section 13 is wrapped in order onto the wrap rolls 16C, 16B and 16A and supplied to the post-processing device 12 via the wrap rolls 16C, 16B and 16A. The buffer device 16 absorbs differences in the conveyance speed by causing the wrap roller 16B to move up and down when the conveyance speed of the continuous paper 20 supplied from the print engine section 13 and the conveyance speed of the continuous paper 20 supplied to the post-processing device 12 are different.

The post-processing device 12 takes up and recovers the continuous paper 20 supplied from the buffer device 16. The recovered continuous paper 20 is cut into pages by an unillustrated cutting device.

Figure 2:
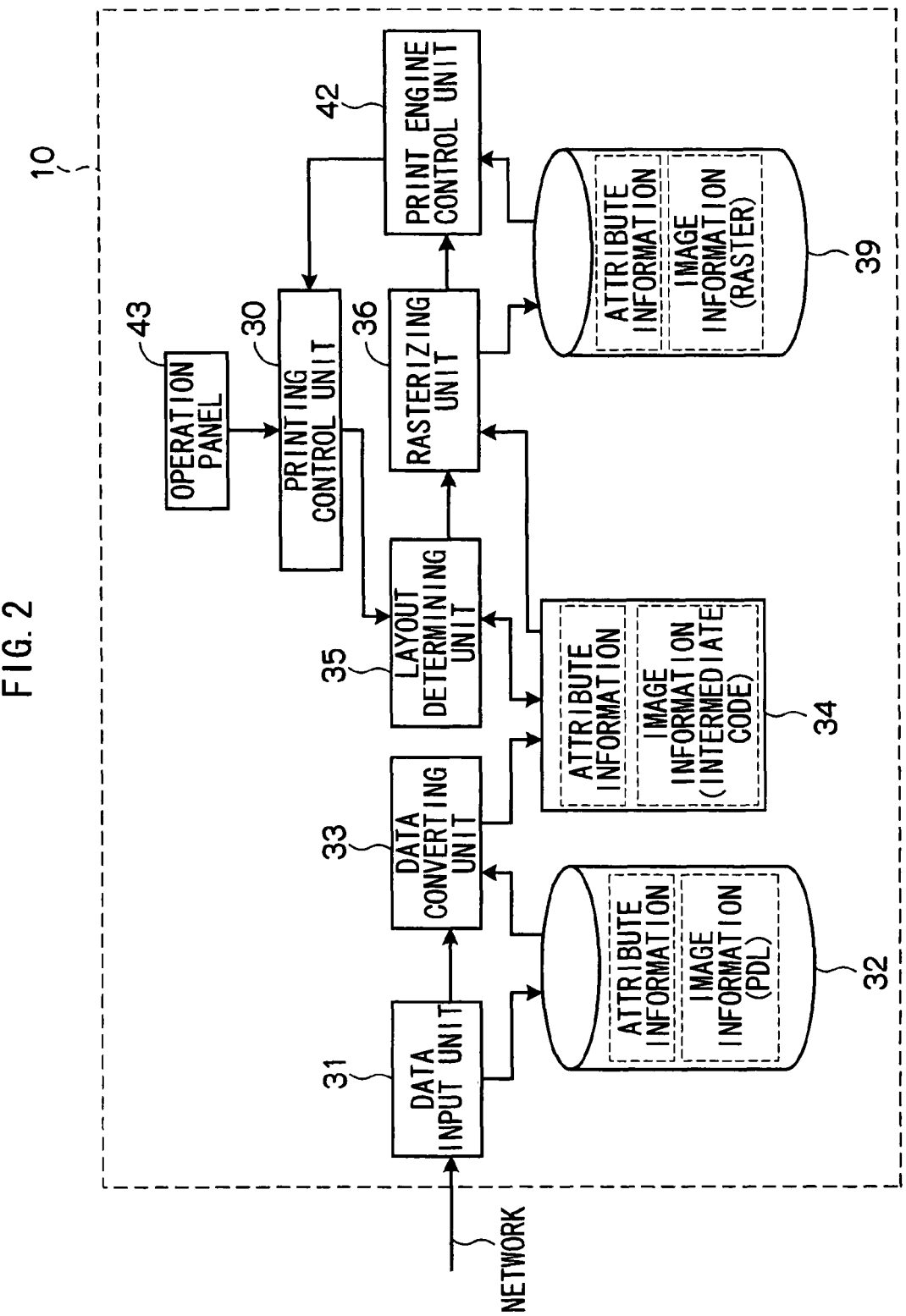
FIG. 2 is a block diagram showing the configuration of a control system of the printing apparatus pertaining to the exemplary embodiment.

In FIG. 2, there is shown the configuration of a control system that controls the printing operation of the printing apparatus 10 pertaining to the present exemplary embodiment.

As shown in FIG. 2, the printing apparatus 10 is disposed with a printing control unit 30, a data input unit 31, a first spool 32, a data converting unit 33, a buffer memory 34, a layout determining unit 35, a rasterizing unit 36, a second spool 39, and a print engine control unit 42.

The printing control unit 30 is connected to the print engine control unit 42, receives status and other information of the print engine section 13 sent from the print engine control unit 42, and manages the state of the print engine section 13.

The printing control unit 30 is also connected to an operation panel 43 disposed on the printing apparatus 10. The operation panel 43 is configured to receive various types of designated input relating to printing from a user. Operation information received by the operation panel 43 is inputted from the operation panel 43 to the printing control unit 30.

The printing apparatus 10 pertaining to the present exemplary embodiment is configured to be capable of printing images of multiple pages in regions of one page of the continuous paper 20 (so-called N-UP printing), and instructions relating to the number of pages (page count) assigned to regions of one page of the continuous paper 20 and the layout of the images are inputted to the operation panel 32.

The printing control unit 30 outputs, to the layout determining unit 35, layout information representing the page count and the layout of the images inputted to the operation panel 43.

The data input unit 31 is connected to a client device (not shown) via a network, and printing information is inputted to the data input unit 31 from the client device. The printing information includes image information described by page description language (PDL) representing images per page to be printed on each page of the continuous paper 20 and attribute information representing image size and printing conditions per page. The data input unit 31 correlates the image information and the attribute information per page and stores the image information and the attribute information in the first spool 32.

The data converting unit 33 sequentially reads the image information that has been stored in the first spool 32 per page and the attribute information that has been correlated with that image information and converts the read image information into image information of an intermediate code format. Specifically, the data converting unit 33 converts the image information described by various types of page description language such as postscripts (PS) into image information of an intermediate code format employed inside the apparatus. Additionally, the data converting unit 33 correlates the image information that has been converted into the intermediate code format with the attribute information that has been correlated with the image information serving as the source of that converted image information and stores the image information and the attribute information in the buffer memory 34.

The layout determining unit 35 determines, on the basis of layout information inputted from the printing control unit 30, how to lay out (assign) on the continuous paper 20 the images represented by each image information set stored in the buffer memory 34. Specifically, for example, the layout determining unit 35 determines with what orientation and size the images represented by each image information set are to be laid out on the continuous paper 20. The layout determining unit 35 outputs the determined layout information to the rasterizing unit 36.

The rasterizing unit 36 reads, on the basis of the layout information inputted from the layout determining unit 35 and in the printing order when printing on the continuous paper 20, the image information that has been stored in the buffer memory 34 and the attribute information that has been correlated with that image information and sequentially converts the read image information of the intermediate code format to raster data of the orientation and size represented by the layout information. The rasterizing unit 36 correlates the converted raster data with the attribute information that has been correlated with the image information serving as the source of that raster data and sequentially stores the raster data and the attribute information in the second spool 39.

The print engine control unit 42 prints images on the continuous paper 20 by reading, in the printing order, the raster data that has been stored in the second spool 39 and the attribute information that has been correlated with that raster data and controlling the print engine section 13 on the basis of the read raster data and attribute information.

Figure 3:
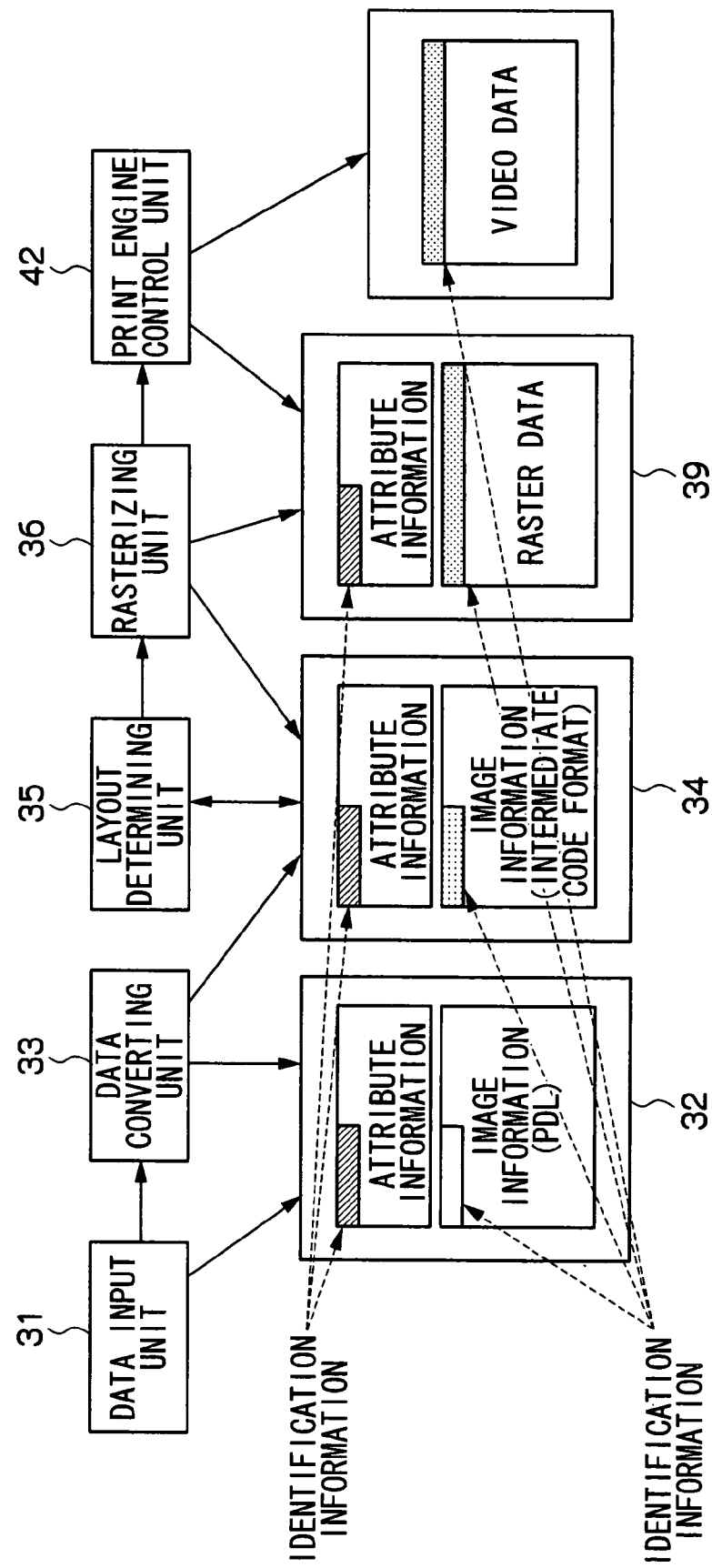
FIG. 3 is a schematic diagram showing the flow of data of image information and attribute information in processing units pertaining to the exemplary embodiment.

Incidentally, in the printing apparatus 10 pertaining to the present exemplary embodiment, as shown in FIG. 3, identification information for identifying each page is embedded with respect to the image information and the attribute information in order to detect when the pages to be printed are out of order and when there is a missing page. Additionally, when various types of processing relating to printing are to be performed with respect to each image information set, the printing apparatus 10 detects when the pages are out of order and when there is a missing page by determining whether or not the processing order is a predetermined page order on the basis of the identification information that has been embedded in each image information set. Further, the printing apparatus 10 also determines the consistency between the image information and the attribute information by determining whether or not the identification information embedded in the image information and the identification information embedded in the attribute information match.

Figure 4:
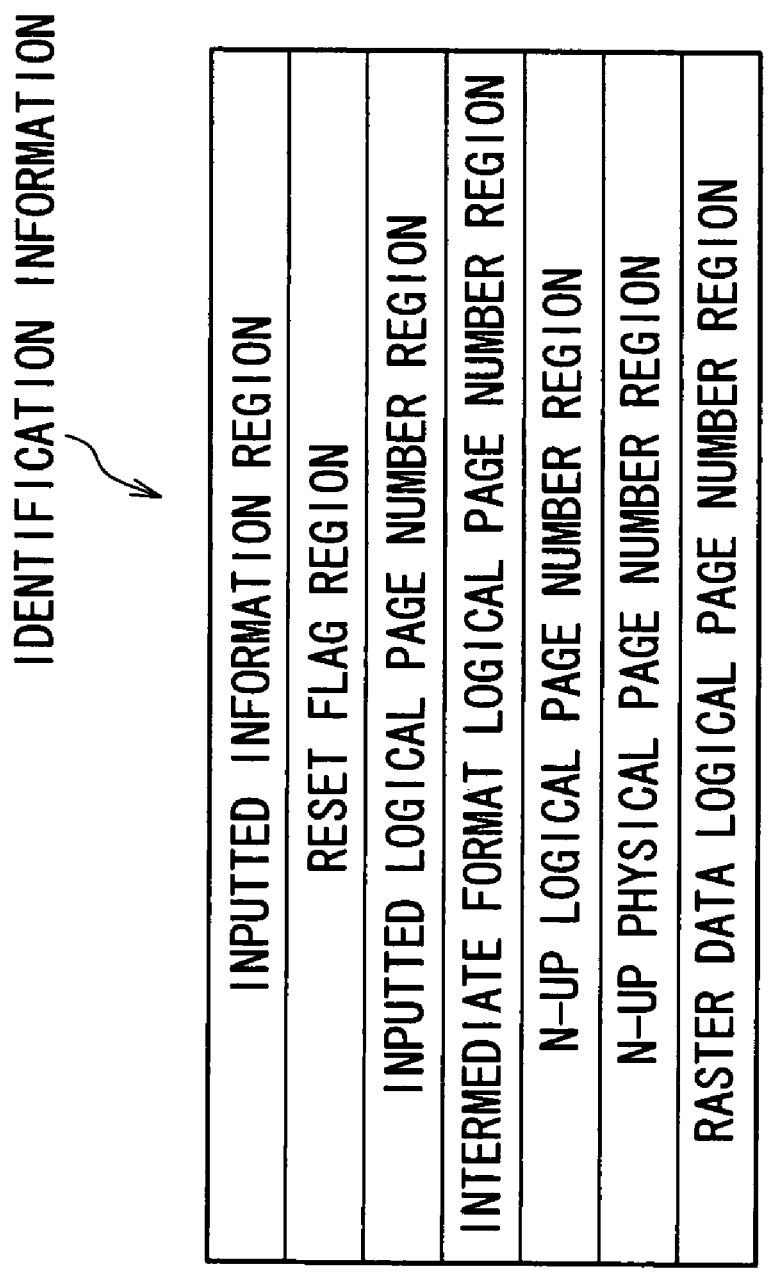
FIG. 4 is a schematic diagram showing the data structure of identification information pertaining to the exemplary embodiment.

In FIG. 4, there is schematically shown an example of the data structure of the identification information embedded in the image information and the attribute information pertaining to the present exemplary embodiment.

The identification information pertaining to the present exemplary embodiment includes an inputted information region, a reset flag region, an inputted logical page number region, an intermediate format logical page number region, an N-UP logical page number region, an N-UP physical page number region, and a raster data logical page number region.

Device information for identifying the client device that has transmitted printing information is stored in the inputted information region.

A predetermined value is set in the reset flag region when resetting (initializing) the page number stored in the intermediate format logical page number region, the N-UP logical page number region, the N-UP physical page number region and the raster data logical page number region.

The inputted logical page number region is a region in which is stored the page number in the page order of each image information set included in the printing information that has been received from the client device.

The intermediate format logical page number region is a region in which is stored the page number in the page order of each image information set that has been converted into the intermediate code format.

The N-UP logical page number region is a region in which is stored the page number in the page order in which the images represented by each image information set are to be printed.

The N-UP physical page number region is a region in which is stored the physical page number of the continuous paper 20 on which the images represented by each image information set are to be laid out.

The raster data logical page number region is a region in which is stored the page number in the printing order of each raster data set.

Next, the action of the printing apparatus 10 pertaining to the present exemplary embodiment will be described.

When printing information is inputted to the data input unit 31 from the client device, the data input unit 31 counts, in the page order, the image information and the attribute information included in that printing information. Then, the data input unit 31 embeds, with respect to the image information and the attribute information, the identification information in whose inputted logical page number regions the count values have been stored as page numbers, correlates the image information and the attribute information per page, and stores the image information and the attribute information in the first spool 32.

Figure 5:
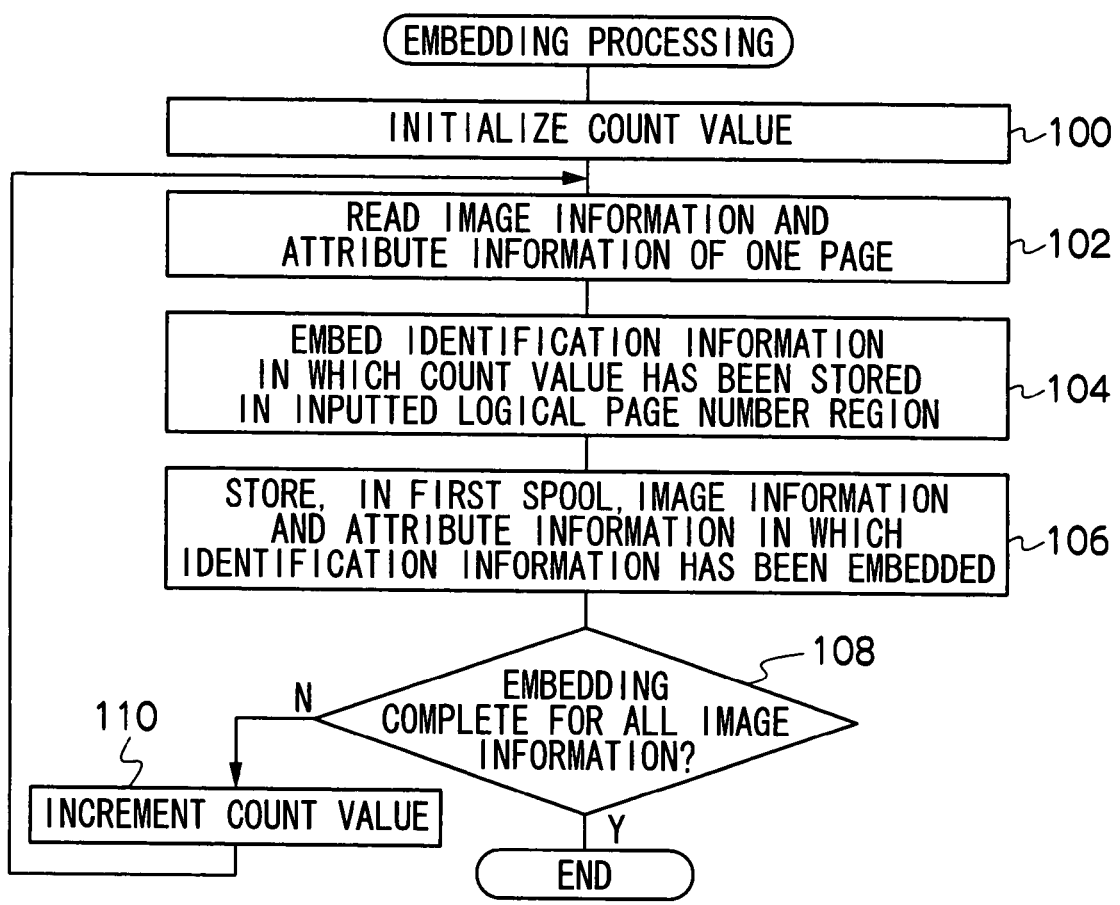
FIG. 5 is a flowchart showing the flow of embedding processing pertaining to the exemplary embodiment.

In FIG. 5, there is shown the flow of embedding processing by which the data input unit 31 embeds the identification information with respect to the image information and the attribute information. It will be noted that this embedding processing is executed each time printing information is inputted.

In step 100 of FIG. 5, the data input unit 31 initializes the count value to zero.

In the next step 102, the data input unit 31 reads the image information and the attribute information of one page included in the printing information per page. In the next step 104, the data input unit 31 embeds, with respect to the image information and the attribute information, the identification information in whose inputted logical page number region the count value has been stored as a page number with respect to the read image information and attribute information. It will be noted that, in step 104, when the count value is zero, the data input unit 31 stores the above-described predetermined value that instructs resetting in the reset flag region of the identification information. Further, in the present exemplary embodiment, when the image information is in a PDL format or an intermediate code format, then the data input unit 31 embeds the identification information as a processing step where no processing is performed, such as an NOP command. Thus, affects on images represented by image information resulting from embedding identification information can be controlled.

In the next step 106, the data input unit 31 correlates the image information and attribute information in which the identification information has been embedded and stores the image information and the attribute information in the first spool 32.

In the next step 108, the data input unit 31 determines whether or not embedding of identification information with respect to all of the image information included in the printing information has been completed. When the determination is NO, then the data input unit 31 moves to step 110, and when the determination is YES, then the data input unit 31 ends processing.

In step 110, the data input unit 31 increments the count value and returns to step 102.

The data converting unit 33 reads, in the page order, the image information that has been stored in the first spool 32 and the attribute information that has been correlated with that image information, performs conversion processing to convert the read image information into image information of the intermediate code format, and determines whether or not the page numbers stored in the inputted logical page number regions of the identification information embedded in the image information count up one at a time. When the page numbers do not count up, then the data converting unit 33 regards this as indicating that the pages are out of order or that there is a missing page and notifies the printing control unit 30.

Thus, the printing control unit 30 displays a message or the like on an unillustrated display device such as a display and notifies the user that an error has occurred.

Further, when the data converting unit 33 performs the above-described conversion processing, the data converting unit 33 determines whether or not the page numbers stored in the inputted logical page number regions of the identification information embedded in the image information and the attribute information match. When the page numbers do not match, then the data converting unit 33 regards this as indicating that there is inconsistency between the image information and the attribute information and notifies the printing control unit 30.

Figure 6:
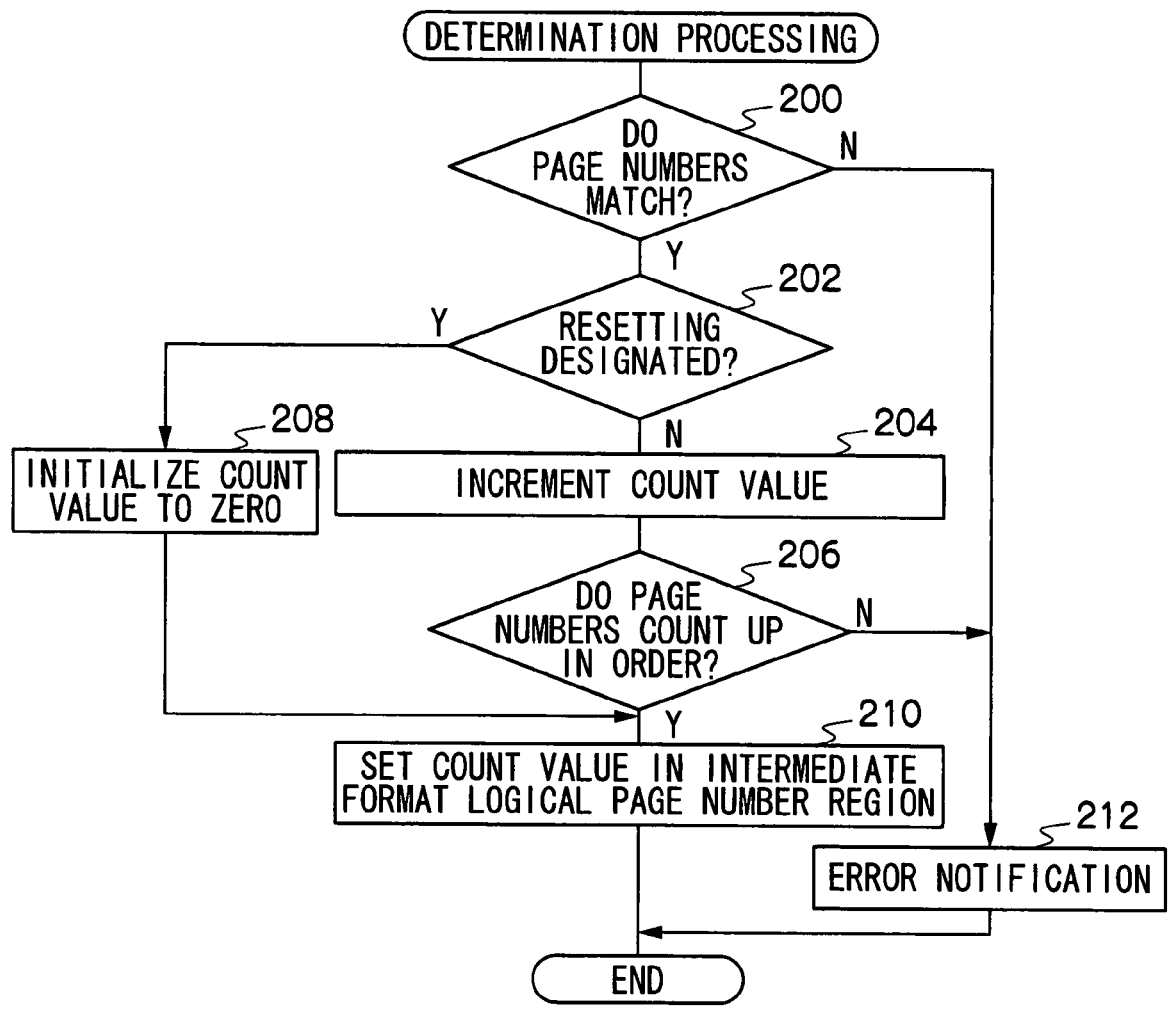
FIG. 6 is a flowchart showing the flow of determination processing pertaining to the exemplary embodiment.

In FIG. 6, there is shown the flow of determination processing by which the data converting unit 33 determines whether or not the pages are out of order and whether or not there is a missing page and determines the consistency between the image information and the attribute information. It will be noted that this determination processing is executed each time the data converting unit 33 reads the image information of one page and the attribute information correlated with that image information.

In step 200 of FIG. 6, the data converting unit 33 determines whether or not the page numbers stored in the inputted logical page number regions of the identification information embedded in the read image information and attribute information match. When the determination is YES, then the data converting unit 33 moves to step 202, and when the determination is NO, then the data converting unit 33 regards this as indicating that there is an inconsistency and moves to step 212. In step 212, the data converting unit 33 notifies the printing control unit 30 that there is an inconsistency.

In step 202, the data converting unit 33 determines whether or not the above-described predetermined value that instructs resetting has been stored in the reset flag region of the identification information embedded in the image information. When the determination is YES, then the data converting unit 33 moves to step 208, and when the determination is NO, then the data converting unit 33 moves to step 204.

In step 204, the data converting unit 33 increments the count value that counts the image information.

In step 206, the data converting unit 33 determines whether or not the page number stored in the inputted logical page number region of the identification information embedded in the image information counts up by one from the page number stored in the inputted logical page number region of the image information that had served as the processing target when the previous determination processing was performed. When the determination is YES, then the data converting unit 33 moves to step 210, and when the determination is NO, then the data converting unit 33 regards this as indicating that the pages are out of order or that there is a missing page and moves to step 212. In step 212, the data converting unit 33 notifies the printing control unit 30 that the pages are out of order or that there is a missing page.

In step 208, the data converting unit 33 initializes the count value to zero.

In step 210, the data converting unit 33 stores the count value as a page number in the intermediate format logical page number regions of the identification information embedded in the image information and the attribute information and ends processing.

When, as a result of the above-described determination processing, the pages are not out of order, there are no missing pages, and the image information and the attribute information are consistent, then the data converting unit 33 converts the image information into image information of the intermediate code format, correlates the converted image information and the attribute information that has been correlated with the image information serving as the source of that converted image information, and stores the image information and the attribute information in the buffer memory 34.

When the layout determining unit 35 determines, on the basis of the layout information inputted from the printing control unit 30, how to lay out on the continuous paper 20 the images represented by each set image information set stored in the buffer memory 34, similar to the data converting unit 33, the layout determining unit 35 determines whether or not the pages are out of order, whether or not there is a missing page, and the consistency between the image information and the attribute information by determining whether or not the page numbers stored in the intermediate format logical page number region of the identification information embedded in the image information count up one at a time and whether or not the page numbers stored in the intermediate format logical page number regions of the identification information embedded in the image information and the attribute information match.

Additionally, when the pages are not out of order, there are no missing pages, and the image information and the attribute information are consistent, then the layout determining unit 35 determines how to lay out on the continuous paper 20 the images represented by each image information set and outputs the determined layout information to the rasterizing unit 36. Further, the layout determining unit 35 stores the page numbers corresponding to the determined layout positions of the images with respect to the N-UP physical page number regions and the N-UP logical page number regions of the identification information embedded in each image information set and each attribute information set stored in the buffer memory 34.

Figure 7:
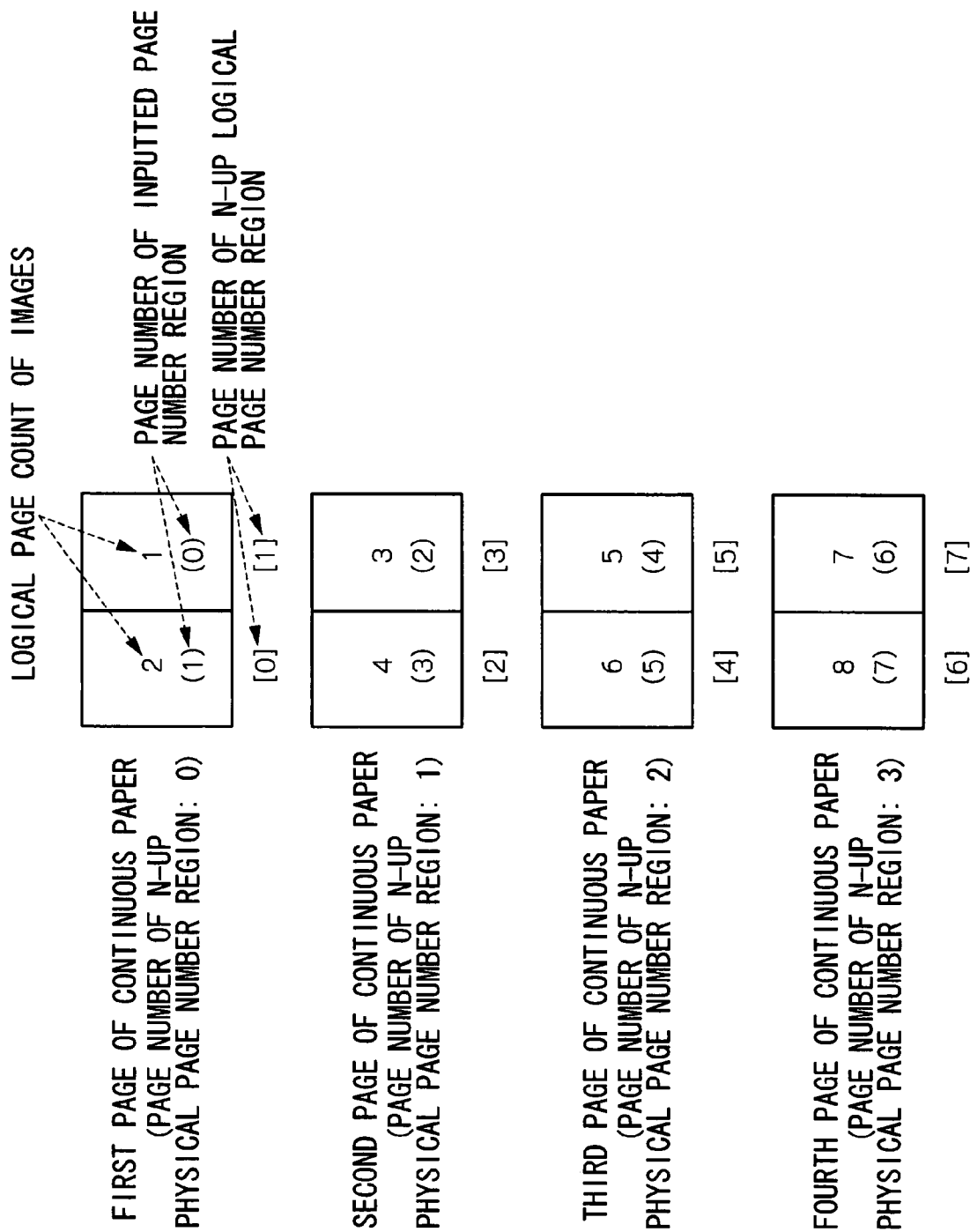
FIG. 7 is a schematic diagram showing the layout relationship between images and continuous paper when images of two pages pertaining to the exemplary embodiment are printed in a page order of right-to-left in a region of one page of the continuous paper.
Figure 8:
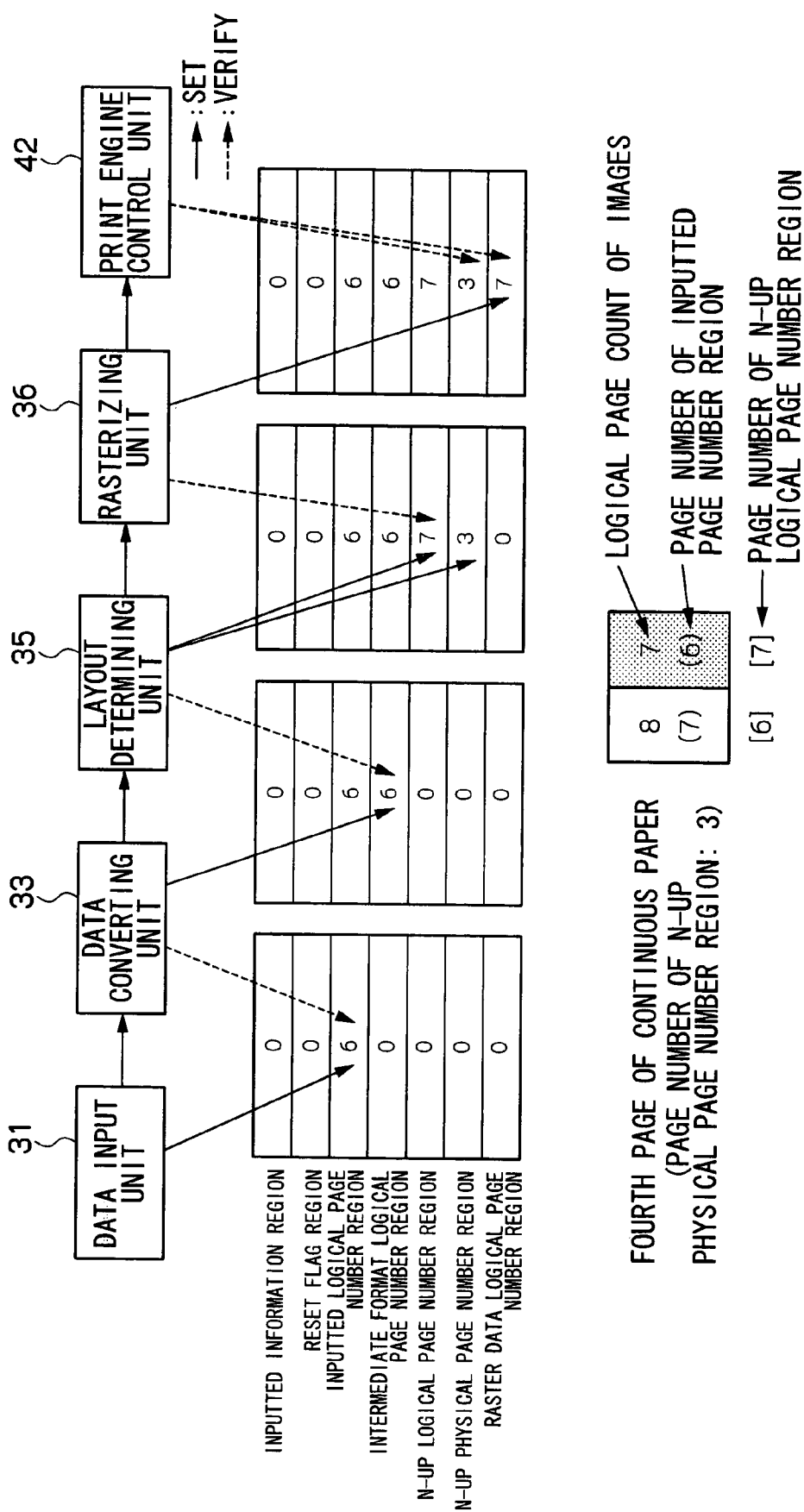
FIG. 8 is a schematic diagram showing an example of page numbers stored in regions of identification information pertaining to the exemplary embodiment.

Here, when, for example, images of two pages are to be printed by the printing apparatus 10 in the page order of right-to-left in a region of one page of the continuous paper 20, then as shown in FIG. 7, an image that is the seventh in the logical page count of the images is printed on the right side of the fourth page of the continuous paper 20. For this reason, as shown in FIG. 8, "7" is stored in the N-UP logical page number region of the identification information included in the image information of the seventh page, and "3" is stored in the N-UP physical page number region.

The rasterizing unit 36 reads, in the page order when printing on the continuous paper 20, the image information that has been stored in the buffer memory 34 and the attribute information that has been correlated with that image information. Additionally, when the rasterizing unit 36 performs conversion processing to convert the read image information of the intermediate code format into raster data, similar to the data converting unit 33, the rasterizing unit 36 determines whether or not the pages are out of order, whether or not there is a missing page, and the consistency between the image information and the attribute information by determining whether or not the page numbers stored in the N-UP logical page number regions of the identification information embedded in the image information count up one at a time, determining whether or not the page numbers stored in the N-UP physical page number regions count up one at a time in units by which the pages of the continuous paper 20 switch, and determining whether or not the page numbers stored in the N-UP logical page number regions and the N-UP physical page number regions of the identification information embedded in the image information and the attribute information match.

Figure 9:
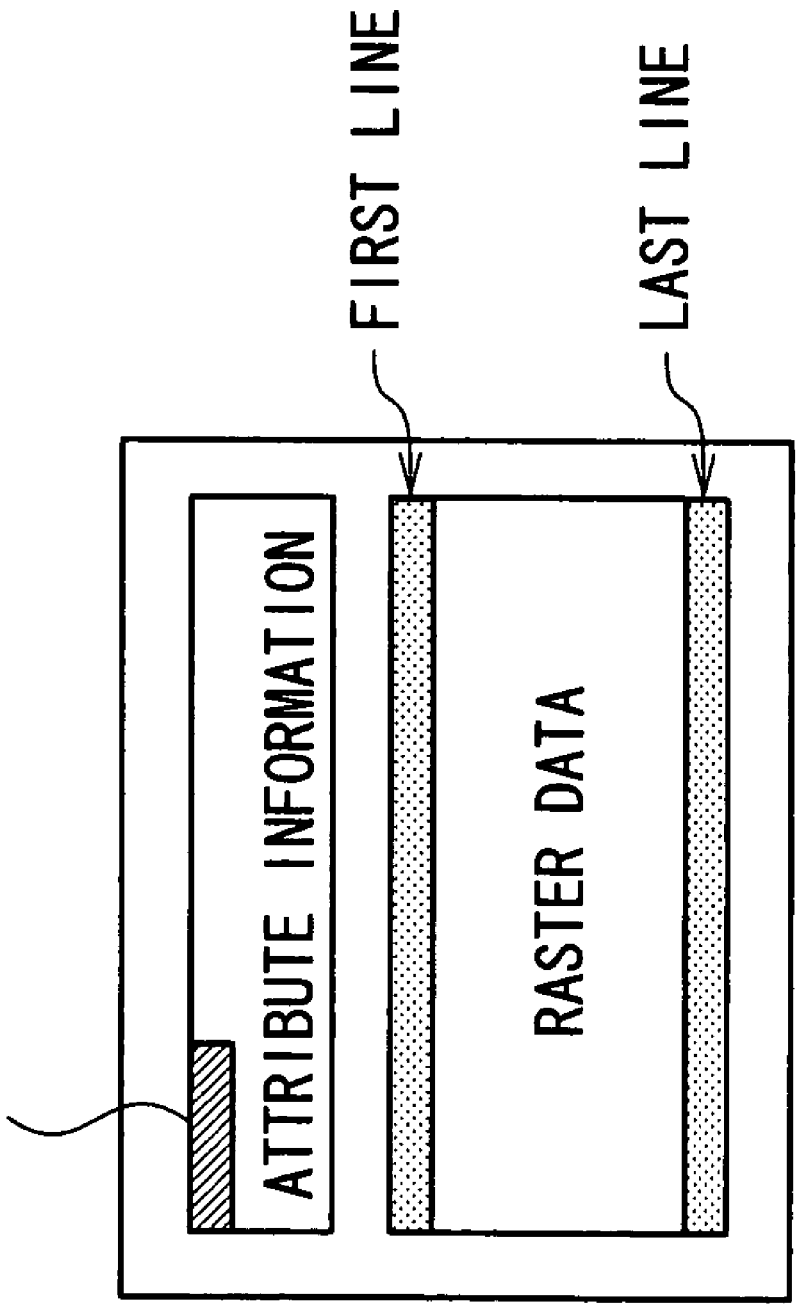
FIG. 9 is a schematic diagram showing an example of lines in which is embedded identification information within an image represented by raster data pertaining to the exemplary embodiment.

Additionally, when the pages are not out of order, there are no missing pages, and the image information and the attribute information are consistent, then the rasterizing unit 36 sequentially converts the image information of the intermediate code format into raster data of the orientation and size represented by the layout information. It will be noted that the rasterizing unit 36 of the present exemplary embodiment converts the image information into raster data and, as shown in FIG. 9, embeds identification information with respect to the raster data by adding identification information to the first one line and/or the last one line of the image represented by the raster data. Further, the rasterizing unit 36 converts the image information into raster data of the orientation and size represented by the layout information by excluding as a processing target with respect to the raster data the line in which the identification information has been embedded and performing image processing to rotate the image and conversion processing to convert the resolution of the image.

Additionally, the rasterizing unit 36 correlates the converted raster data with the attribute information that has been correlated with the image information serving as the source of that raster data and sequentially stores the raster data and the attribute information in the second spool 39.

The print engine control unit 42 prints the images on the continuous paper 20 by controlling the print engine section 13 on the basis of the raster data and the attribute information stored in the second spool 39. It will be noted that the rasterizing unit 36 pertaining to the present exemplary embodiment excludes as a processing target the line in which the identification information of the image represented by the raster data has been embedded, or replaces the line in which the identification information has been embedded with blank space, and controls the print engine section 13.

As described above, according to the present exemplary embodiment, when the printing apparatus 10 embeds page numbers for identifying the pages to be printed with respect to image information representing images per page to be printed on each page of the continuous paper 20 and continuously performs predetermined processing relating to printing with respect to each image information set in which the page numbers have been embedded, the printing apparatus 10 determines whether or not the processing order is a predetermined page order on the basis of the identification information that has been embedded in each image information set and, when the processing order is the predetermined page order, performs the predetermined processing in a state where the identification information remains embedded with respect to the image information serving as the determination target, whereby the printing apparatus 10 can maintain the consistency between the image information and the page numbers with respect to that image information.

Further, according to the present exemplary embodiment, the printing apparatus 10 further embeds the identification information with respect to the attribute information and determines whether or not the identification information that has been embedded in the image information and the identification information that has been embedded in the attribute information that has been correlated with that image information match, whereby the printing apparatus 10 can maintain the consistency between the image information and the attribute information.

In the printing apparatus 10 pertaining to the present exemplary embodiment, a case was described where the page numbers were stored in the identification information and the stored page numbers were each determined in the data converting unit 33, the layout determining unit 35 and the rasterizing unit 36, but the present invention is not limited to this and may also be configured to determine whether or not the page numbers stored in the identification information are a predetermined page order in the data input unit 31.

Further, in the printing apparatus 10 pertaining to the present exemplary embodiment, a case was described where the line in which the identification information has been embedded is excluded as a processing target or the line in which the identification information has been embedded is replaced with blank space, but the present invention is not limited to this and may also be configured to form an image including the line in which the identification information has been embedded.

Further, in the printing apparatus 10, a case was described where the identification information was added to the first one line or the last one line of the image represented by the raster data, but the present invention is not limited to this and may also be configured to add the identification information as a line on a side surface of the image or to add the identification information to the first line, the last line and a line on the side surface. Further, the number of lines is also not limited to one line.

Further, in the printing apparatus 10 pertaining to the present exemplary embodiment, a case was described where the printing apparatus 10 performed image processing to rotate the images and conversion processing to convert the resolution of the images excluding as a processing target the line in which the identification information has been embedded, but the present invention is not limited to this and may also perform compression processing of the image information, for example.

Further, in the printing apparatus 10 pertaining to the present exemplary embodiment, a case was described where the printing apparatus 10 performed with respect to the raster data image processing to rotate the images excluding as a processing target the line in which the identification information has been embedded, but the present invention is not limited to this and may also perform image processing that rotates the images represented by the raster data in a state where the line in which the identification information has been embedded is included and perform processing where rotation angle information representing the angle by which those images have been rotated is included in the attribute information that has been correlated with that image information. Thus, even when the raster data is rotated in a state where the line in which the identification information has been embedded is included, the rotation angle of the line in which the identification information has been embedded can be understood from the rotation angle information included in the attribute information, so the consistency between the image information and the page numbers with respect to that image information can be maintained.

Further, in the printing apparatus 10 pertaining to the present exemplary embodiment, a case was described where the identification information was embedded with respect to the image information and the attribute information in the data input unit 31, but the present invention is not limited to this and may also be configured such that the data input unit 31 causes the printing information inputted from the client device to be stored in the first spool 32 as is, the data converting unit 33 converts the image information included in the printing information to image information of the intermediate code format, counts the image information in the page order, and embeds, with respect to the image information and the attribute information, the identification information in whose inputted logical page number regions the count values have been stored as page numbers.

Further, in the present exemplary embodiment, a case was described where the image information and the attribute information were included in the printing information, but the present invention is not limited to this, and when attribute information is not included in the printing information, for example, the identification information may be embedded just in the image information. Further, the data input unit 31 may also generate attribute information corresponding to the image information and embed the identification information.

Figure 10:
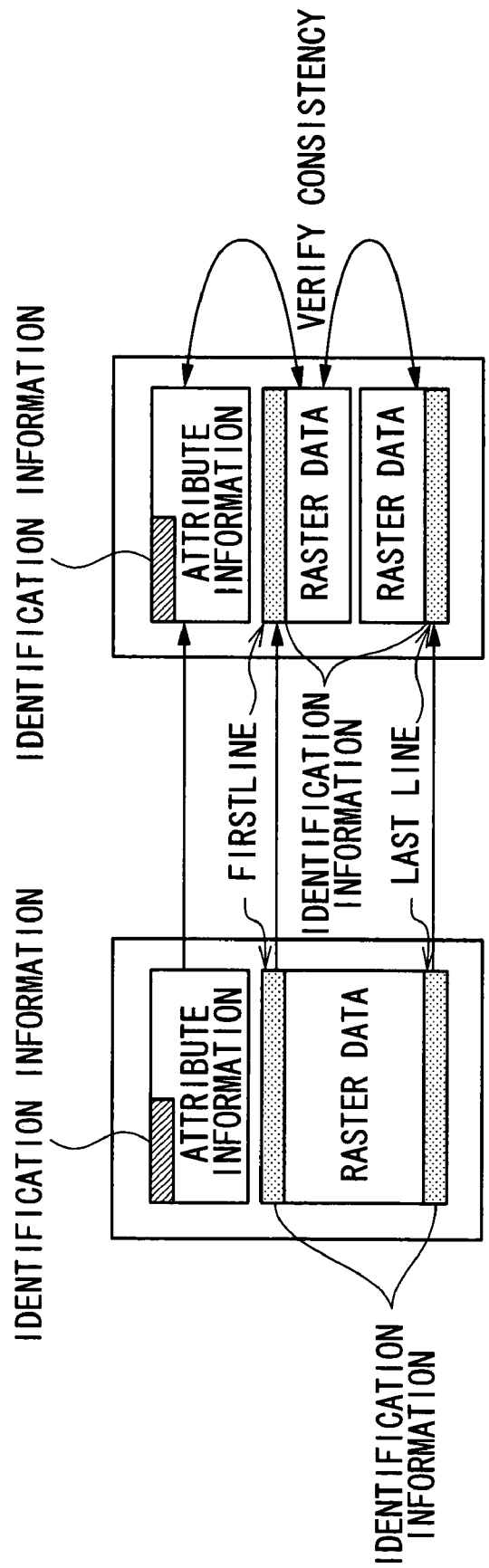
FIG. 10 is a schematic diagram showing another example of lines in which is embedded identification information within an image represented by raster data pertaining to the exemplary embodiment.

Incidentally, instances where the data amount of the raster data is large, such as instances where raster data of one page cannot be stored in one buffer memory by transfer of the raster data between the processing units, are also conceivable, and in such instances, the raster data of one page must be plurally divided and a same page data assurance problem occurs. In such instances, when the rasterizing unit is to output the raster data in advance, as shown in FIG. 10, for example, the same identification information may be embedded in the first line and the last line of the raster data. Thus, even when the raster data has been divided into two buffer memories by some transfer of the raster data, the consistency between the raster data and the page numbers with respect to that raster data can be maintained.

In addition, the configuration of the printing apparatus 10 described in the present exemplary embodiment (see FIG. 1) and the configuration of the control system of the printing apparatus 10 (see FIG. 2) are merely examples and may of course be appropriately altered within a range that does not depart from the gist of the present invention.

Further, the data structure of the identification information (see FIG. 4) described in the present exemplary embodiment is also merely an example and may of course be appropriately altered within a range that does not depart from the gist of the present invention.

Moreover, the flows of the embedding processing (see FIG. 5) and the determination processing (see FIG. 6) described in the present exemplary embodiment are also merely examples and may of course be appropriately altered within a range that does not depart from the gist of the present invention.

As described above, according to the present invention, the printing apparatus embeds identification information for identifying the pages to be printed with respect to image information, determines whether or not the processing order is a predetermined page order on the basis of the identification information that has been embedded in each image information set and, when the processing order is the predetermined page order, performs predetermined processing in a state where the identification information remains embedded with respect to the image information serving as the determination target, whereby the printing apparatus has the excellent effect that it can maintain the consistency between the image information and the page numbers with respect to that image information.

What is claimed is:

1. A printing apparatus comprising:
an embedding unit that embeds first identification information for identifying pages to be printed with respect to image information representing images per page to be printed on each page of a recording medium; and
a processing unit which, when performing predetermined processing relating to printing with respect to each image information set in which the first identification information has been embedded, determines whether or not the processing order is a predetermined page order on the basis of the first identification information that has been embedded in each image information set and, when the processing order is the predetermined page order, performs the predetermined processing in a state where the first identification information remains embedded with respect to the image information serving as the determination target wherein,
attribute information representing the per page printing conditions is correlated with the image information,
the embedding unit further embeds second identification information with respect to the attribute information that has been correlated with the image information in which the first identification information has been embedded, and
the processing unit determines whether or not the first identification information that has been embedded in the image information and the second identification information that has been embedded in the attribute information that has been correlated with that image information match and performs the predetermined processing when they match.

2. The printing apparatus of claim 1, wherein
the embedding unit adds the first identification information to a predetermined region of boundary portions of the images represented by the image information to thereby embed the first identification information with respect to the image information, and
the processing unit performs with respect to the image information, as with the predetermined region of the images represented by the image information being excluded as a processing target, processing selected from among image processing that rotates the images, conversion processing that converts the resolution of the images, and compression processing of the image information.

3. The printing apparatus of claim 1, wherein
the processing unit plurally divides the image information of one page and performs the predetermined processing with respect to each divided image information set that has been divided, and
the embedding unit embeds the first and second identification information with respect to each divided image information set.

4. The printing apparatus of claim 1, wherein
the first and second identification information is a page count representing the pages on which the images represented by the image information are to be printed, and
the processing unit determines whether or not the processing order is the page order to be printed on the basis of the page count that has been embedded in each image information set.

5. The printing apparatus of claim 4, wherein
the embedding unit further embeds initialization information representing that the page count to be embedded with respect to the image information is to be initialized to a predetermined initial value, and
the processing unit determines the page order to be an order beginning with the initial value when the initialization information has been embedded in the image information.

6. The printing apparatus of claim 1, wherein
the embedding unit embeds the first identification information inside an image region of the images represented by the image information, and
the processing unit performs with respect to the image information image processing that rotates the images represented by that image information and performs processing where rotation angle information representing the angle by which the images have been rotated is included in the attribute information that has been correlated with that image information.

7. The printing apparatus of claim 1, wherein the first identification information is embedded in an image region of the image represented by the image information.

8. A printing method comprising:

embedding first identification information for identifying pages to be printed in image information representing images per page to be printed on each page of a recording medium;

determining whether or not the processing order is a predetermined page order on the basis of the first identification information that has been embedded in each image information set; and, when the processing order is the predetermined page order, performing predetermined processing relating to printing in a state where the first identification information remains embedded with respect to the image information serving as the determination target, wherein attribute information representing the per page printing conditions is correlated with the image information, the embedding further embeds second identification information with respect to the attribute information that has been correlated with the image information in which the first identification information has been embedded, and the determining process determines whether or not the first identification information that has been embedded in the image information and the second identification information that has been embedded in the attribute information that has been correlated with that image information match and continuously performs predetermined processing when they match.

9. The printing method of claim 8, wherein the embedding adds the first identification information to a predetermined region of boundary portions of the images represented by the image information, and the printing method includes performing with respect to the image information, with the predetermined region of the images represented by the image information being excluded as a processing target, processing selected from among image processing that rotates the images, conversion processing that converts the resolution of the images, and compression processing of the image information.

10. The printing method of claim 8, wherein the printing method plurally divides the image information of one page and performs the predetermined processing with respect to each divided image information set, and the embedding embeds the first and second identification information with respect to each divided image information set.

11. The printing method of claim 8, wherein the first and second identification information is a page count representing the pages on which the images represented by the image information are to be printed, and the determining determines whether or not the processing order is the page order to be printed on the basis of the page count that has been embedded in each image information set.

12. The printing method of claim 11, wherein the embedding further embeds initialization information representing that the page count to be embedded with respect to the image information is to be initialized to a predetermined initial value, and the determining process determines the page order to be an order beginning with the initial value when the initialization information has been embedded in the image information.

13. The printing method of claim 8, wherein the first identification information is embedded in an image region of the image represented by the image information.

* * * * *